US012780079B2

(12) United States Patent
Yabushita et al.

(10) Patent No.: US 12,780,079 B2
(45) Date of Patent: Nov. 3, 2026

(54) OBJECT RECOGNITION APPARATUS

(71) Applicant: TOYOTA JIDOSHA KABUSHIKI KAISHA, Toyota (JP)

(72) Inventors: Hiroki Yabushita, Toyota (JP); Hirotaka Hatakeyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 18/944,557

(22) Filed: Nov. 12, 2024

(65) Prior Publication Data

US 2025/0229697 A1 Jul. 17, 2025

(30) Foreign Application Priority Data

Jan. 11, 2024 (JP) ................................ 2024-002507

(51) Int. Cl.
*B60Q 1/06* (2006.01)
*B60Q 1/00* (2006.01)
(Continued)

(52) U.S. Cl.
CPC ............ *B60Q 1/06* (2013.01); *B60Q 1/0023* (2013.01); *B60W 30/09* (2013.01); *G06T 5/20* (2013.01); *G06T 5/73* (2024.01); *G06V 20/58* (2022.01); *H05B 47/125* (2020.01); *G06T 2207/10152* (2013.01); *G06T 2207/20192* (2013.01); *G06T 2207/30261* (2013.01)

(58) Field of Classification Search
CPC .. B60Q 1/06; B60Q 1/0023; B60Q 2300/056; B60Q 2300/42; B60Q 2300/45; B60Q 1/143; B60W 30/09; G06T 5/20; G06T 5/73; G06T 2207/10152; G06T 2207/20192; G06T 2207/30261; G06V 20/58; H05B 47/125
See application file for complete search history.

(56) References Cited

U.S. PATENT DOCUMENTS

| | | | |
|---|---|---|---|
| 9,105,190 B2 | 8/2015 | Akiyama | |
| 9,393,960 B2 | 7/2016 | Kodaira | |

(Continued)

FOREIGN PATENT DOCUMENTS

| | | | | |
|---|---|---|---|---|
| JP | 2001-101428 A | | 4/2001 | |
| JP | 5281023 | * | 8/2011 | H04N 7/18 |

(Continued)

*Primary Examiner* — Brodie J Follman
(74) *Attorney, Agent, or Firm* — Oliff PLC

(57) ABSTRACT

To effectively improve the recognition accuracy of the object, provided is an object recognition apparatus comprising an imaging unit for capturing front of a vehicle, an object recognition unit configured to calculate a reliability of an object recognition of an object in the image, and recognizes the object as an object actually present when the reliability is equal to or larger than a threshold value, a light control unit for controlling a light distribution of a headlamp in a light distribution pattern including an irradiation area and a light control area for shielding or dimming the irradiation light based on an existence information of the object, and a threshold change unit configured to changing, when the object in the image does not exist in the irradiation area, the threshold value to a smaller value than when the target is present in the irradiation area.

3 Claims, 5 Drawing Sheets

(51) Int. Cl.

| | |
|---|---|
| ***B60W 30/09*** | (2012.01) |
| ***G06T 5/20*** | (2006.01) |
| ***G06T 5/73*** | (2024.01) |
| ***G06V 20/58*** | (2022.01) |
| ***H05B 47/125*** | (2020.01) |

(56) References Cited

U.S. PATENT DOCUMENTS

| | | | | |
|---|---|---|---|---|
| 9,483,945 | B2 | 11/2016 | Okita et al. | |
| 9,873,412 | B2 | 1/2018 | Moriizumi | |
| 10,793,147 | B2 | 10/2020 | Kaminade et al. | |
| 2018/0139372 | A1 | 5/2018 | Koshisaka et al. | |
| 2021/0061309 | A1 | 3/2021 | Kawanai | |
| 2021/0107521 | A1 | 4/2021 | Fujita et al. | |
| 2021/0107528 | A1 | 4/2021 | Fujita et al. | |
| 2021/0146956 | A1 | 5/2021 | Fujita et al. | |
| 2021/0146958 | A1 | 5/2021 | Tanaka et al. | |
| 2023/0371155 | A1* | 11/2023 | Baker et al. | B60Q 1/12 |

FOREIGN PATENT DOCUMENTS

| | | | | |
|---|---|---|---|---|
| JP | 2012-166652 A | | 9/2012 | |
| JP | 2015148887 | * | 8/2015 | G06T 5/00 |
| JP | 2018-078520 A | | 5/2018 | |
| JP | 2019185639 | * | 10/2019 | B60W 30/09 |
| JP | 7241772 | * | 10/2021 | G06T 7/00 |

* cited by examiner

OBJECT RECOGNITION APPARATUS

CROSS-REFERENCE TO RELATED APPLICATION

This application claims priority to Japanese Patent Application No. JP2024-002507 filed on Jan. 11, 2024, the content of which is hereby incorporated by reference in its entirety into this application.

BACKGROUND OF THE INVENTION

1. Field of the Invention

The present disclosure relates to an object recognition apparatus, and more particularly, to a technique suitable for recognition of the object in front of a vehicle.

2. Description of the Related Art

For example, Japanese Patent Application Laid-Open (kokai) No. 2018-078520 discloses a technique in which, in an onboard image processing apparatus, a correction threshold value of a pixel value used for image recognition processing is changed between a case where a headlamp is in a low beam state and a case where a headlamp is in a high beam state, so that appropriate object recognition can be performed even in a low beam state.

For example, in a vehicle equipped with a system that partially switches between the high beam state and the low beam state, such as an adaptive high beam system (AHS), the irradiation area of the headlamp is constantly variable in each of the high beam state and the low beam state. Therefore, as in the device described in Patent Document, only changing the correction threshold value of the pixel value based on whether the headlamp is in the low beam state or the high beam state does not appropriately perform the correction process, and there is a possibility that erroneous detection or undetected of the object may occur.

SUMMARY OF THE INVENTION

The present disclosure discloses a technique which has been achieved so as to solve the above-described problem, and an object thereof is to effectively improve the recognition accuracy of the object.

An apparatus according to at least one embodiment of the present disclosure is an object recognition apparatus. The object recognition apparatus comprising an imaging unit for capturing an image of a predetermined area in front of a vehicle, an object recognition unit configured to calculate a reliability of an object recognition of an object in the image captured by the imaging unit, and recognizes the object as an object actually present when the calculated reliability is equal to or larger than a predetermined reliability threshold value, a light distribution control unit for controlling a light distribution of a headlamp in a light distribution pattern including an irradiation area for irradiating the irradiation light and a light control area for shielding or dimming the irradiation light by shielding or dimming a part of the irradiation light irradiated from the headlamp provided in the vehicle based on an existence information of the object exist in front of the vehicle, and a reliability threshold change unit configured to changing, when the object in the image does not exist in the irradiation area, the reliability threshold value to a smaller value than when the target is present in the irradiation area.

DESCRIPTION OF THE EMBODIMENTS

Description is now given of an object recognition apparatus according to at least one embodiment of the present disclosure with reference to the drawings.

<Hardware Configuration>

Figure 1:
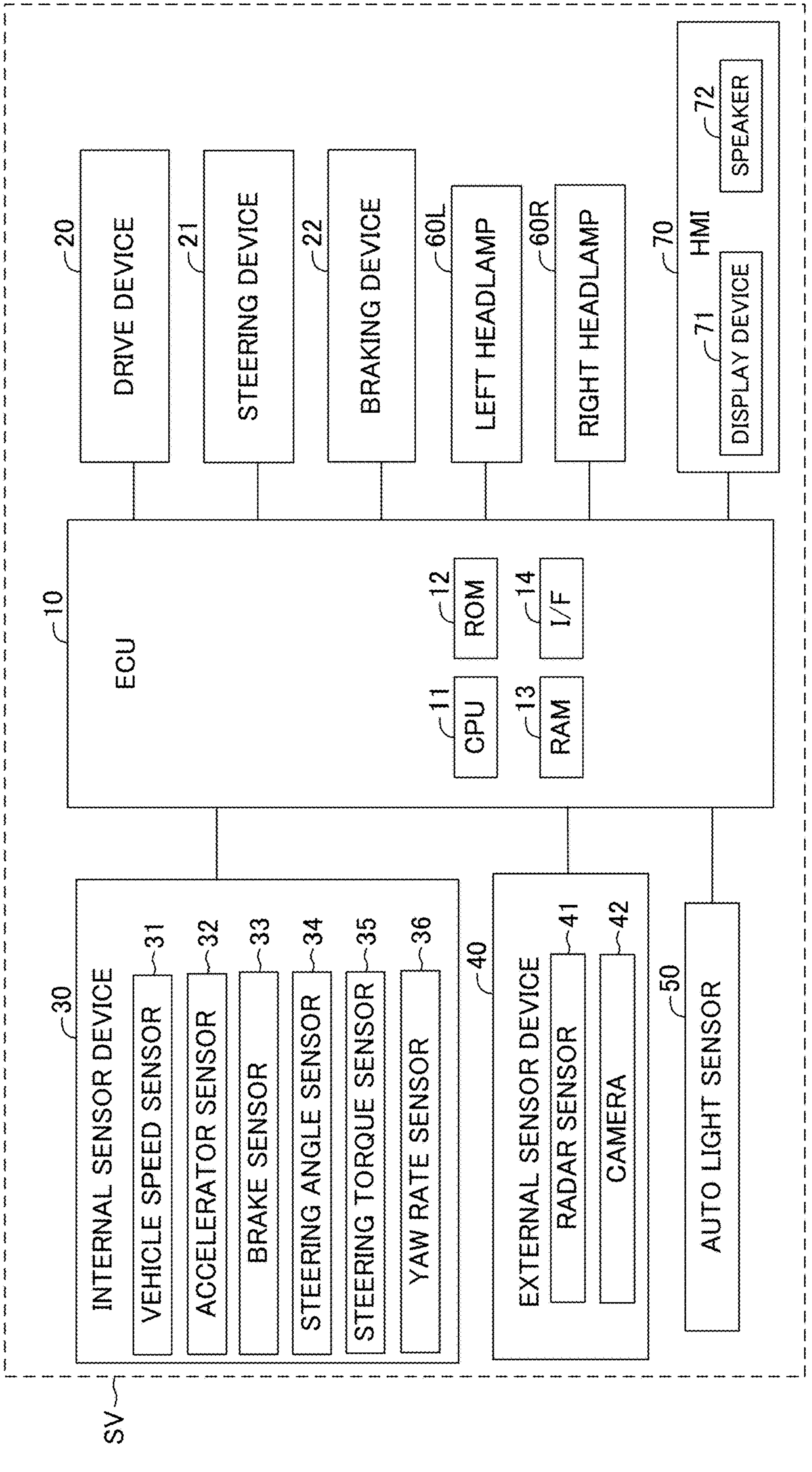
FIG. 1 is a schematic diagram showing a hardware configuration of a vehicle according to the present embodiment.

FIG. 1 is a schematic diagram of a hardware configuration of a vehicle VH according to the present embodiment. Hereinafter, the vehicle VH may be referred to as an own vehicle when it is required to distinguish it from other vehicles.

The vehicle VH has an ECU (Electronic Control Unit) 10. The ECU 10 includes a CPU (Central Processing Unit) 11, ROM (Read Only Memory) 12, RAM (Random Access Memory) 13, an interface device 14, and the like. The CPU 11 executes various programs stored in the ROM 12. The ROM 12 is a non-volatile memory that stores data and the like required for the CPU 11 to execute various programs. The RAM 13 is a volatile memory to provide a working region that is deployed when various programs are executed by the CPU 11. The interface device 14 is a communication device for communicating with an external device.

The ECU 10 is a central device which executes a driver assist control of the vehicle VH, such as a collision avoidance control (Pre-Crash Safety Control: PCS control), and the like. The driving assist control is a concept which encompasses automatic driving control. A drive device 20, a steering device 21, a braking device 22, an internal sensor device 30, an external sensor device 40, an auto light sensor 50, a left headlamp 60L, a right headlamp 60R, a HMI (Human Machine Interface) 70, and the like are communicably connected to the ECU 10.

The drive device 20 generates a driving force to be transmitted to driving wheels of the vehicle VH. As the drive device 20, for example, an engine and a motor are given. In the device according to the at least one embodiment, the vehicle VH may be any one of a hybrid electric vehicle (HEV), a plug-in hybrid electric vehicle (PHEV), a fuel cell electric vehicle (FCEV), a battery electric vehicle (BEV), and an engine vehicle. The steering device 21 applies steering forces to steerable wheels of the vehicle VH. The braking device 22 applies a braking force to the wheels of the vehicle VH.

The internal sensor device 30 is sensors which acquire states of the vehicle VH. Specifically, the internal sensor device 30 includes a vehicle speed sensor 31, an accelerator sensor 32, a brake sensor 33, a steering angle sensor 34, a steering torque sensor 35, a yaw rate sensor 36, and the like.

The vehicle speed sensor 31 detects a travel speed (vehicle speed v) of the vehicle VH. The accelerator sensor 32 detects an operation amount of an accelerator pedal (not shown) by the driver. The brake sensor 33 detects an operation amount of a brake pedal (not shown) by the driver. The steering angle sensor 34 detects a rotational angle of a steering wheel or a steering shaft (not shown) of the vehicle VH, that is, a steering angle. The steering torque sensor 35 detects a rotational torque of a steering wheel or a steering shaft (not shown) of the vehicle VH, that is, a steering torque. The yaw rate sensor 36 detects a yaw rate of the vehicle VH. The internal sensor device 30 transmits the condition of the vehicle VH detected by the sensors 31 to 36 to the ECU 10 at a predetermined cycle.

The external sensor device 40 is sensors which acquire object information on objects around the vehicle VH. Specifically, the external sensor device 40 includes a radar sensor 41, a camera 42, etc. As the object information, there are given, for example, a peripheral vehicle, a pedestrian, a traffic light, a white line of a road, a traffic sign, and the like.

The radar sensor 41 detects an object that is present around the vehicle VH. The radar sensor 41 includes a millimeter wave radar or Lidar. The millimeter wave radar radiates a radio wave (millimeter wave) in a millimeter wave band, and receives the millimeter wave (reflected wave) reflected by the object existing within a radiation range. The millimeter wave radar acquires a relative distance between the vehicle VH and the object, a relative speed between the vehicle VH and the object, and the like based on a phase difference between the transmitted millimeter wave and the received reflected wave, an attenuation level of the reflected wave, a time from the transmission of the millimeter wave to the reception of the reflected wave, and the like. The Lidar sequentially scans laser light in a pulse form having a shorter wavelength than that of the millimeter wave in a plurality of directions, and receives reflected light reflected by the object, to thereby acquire a shape of the object detected in front of the vehicle VH, the relative distance between the vehicle VH and the object, the relative speed between the vehicle VH and the object, and the like. The camera 42 is an imaging unit of the present disclosure and obtain the object information in front of the vehicle VH by capturing a region in front of the vehicle VH. As the camera 42, for example, a digital camera having an image sensor such as a CMOS or a CCD can be used. The external sensor device 40 repeatedly transmit the object information acquired by the radar sensor 41 and the camera 42 to the ECU 10 each time a predetermined time elapses.

The auto light sensor (illuminance sensor) 50 is a sensor that detects illuminance of light. The auto light sensor 50 is mounted on the vehicle VH so as to be able to detect the illuminance around the vehicle VH. The auto light sensor 50 transmits the detected illuminance information to the ECU 10 at a predetermined cycle.

The left headlamp 60L and the right headlamp 60R project irradiation light in the forward direction of the vehicle VH. Herein, "the forward direction of the vehicle VH" is a conceptual expression which encompasses not only the front direction but also an obliquely left forward direction and an obliquely right forward direction. The left headlamp 60L is provided on the left side of a front portion of the vehicle VH. The right headlamp 60R is provided on the right side of the front portion of the vehicle VH. Notably, the left headlamp 60L and the right headlamp 60R basically have the same structure; specifically, have respective structures which are mirror-images of each other. Therefore, in the following description, in the case where the left headlamp 60L and the right headlamp 60R are not required to be distinguished from each other, the left headlamp 60L and the right headlamp 60R may be referred to simply as the "headlamp 60." Also, as to the low beam (headlamp for passing each other) provided in the headlamp 60, description is omitted.

The headlamp 60 includes a low beam headlamp and a high beam headlamp. The low beam headlamp irradiates a front area of the vehicle VH with the low beam irradiation light. The high beam headlamp irradiates the high beam irradiation light to an area wider than the low beam irradiation light toward the front area of the vehicle VH. The headlamp 60 is turned on or off in response to an instruction signal transmitted from the ECU 10 in response to an operation of an operating device (not shown) by the driver. Further, when the operating device (not shown) is operated to the automated position, the headlamp 60 is turned on or off in response to an instruction signal transmitted from the ECU 10 based on the illuminance information acquired by the auto light sensor 50.

The headlamp 60 is the headlamp corresponding to the AHS, and has a function of shielding a part of an irradiated area by high beam irradiation in accordance with a position of a light control target object (for example, a preceding vehicle, an oncoming vehicle, a pedestrian, a sign, or the like) acquired by the external sensor device 40. Notably, in the present disclosure, "shielding of irradiation light" is a conceptual expression which "dimming of irradiation light" encompasses. Examples of the headlamp having such a function include a headlamp including a plurality of LED (Light Emitting Diode) arranged in a matrix shape, a headlamp including a DMD (Digital Mirror Device) constituted by a plurality of micro-mirror elements arranged in a matrix shape, and a headlamp including a MEMS (Micro Electro Mechanical Systems) mirror. Since the configuration of these headlamps is known, detailed description thereof will be omitted.

The HMI 70 is an interface for inputting and outputting data between the ECU 10 and the driver, and includes an input device and an output device. Examples of the input device include a touch panel, a switch, and a sound pickup microphone. Examples of the output device include a display device 71 and a speaker 72. The display device 71 is, for example, a center display installed in an instrument panel or the like, a multi-information display, a head-up display, or the like. The speaker 72 is, for example, a speaker of an acoustic system or the navigation system.

<Software Configuration>

Figure 2:
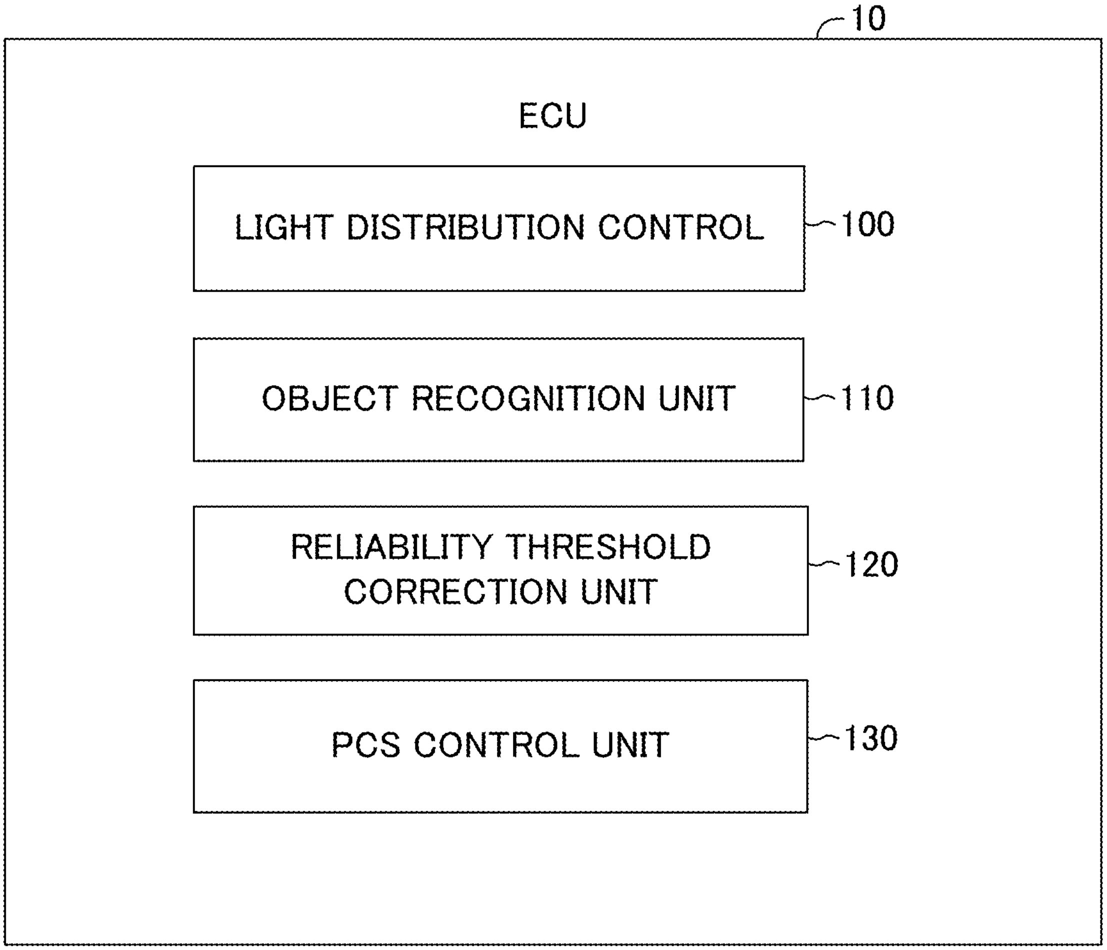
FIG. 2 is a schematic diagram showing a software configuration of a control device to the present embodiment.

FIG. 2 is a schematic diagram showing a software configuration of the ECU 10 to the present embodiment. As shown in FIG. 2, the ECU 10 includes a light distribution control unit 100, an object recognition unit 110, an illumination light control area specifying unit 120, a PCS control unit 130, and the like as a part of functional elements. The CPU 11 of the ECU 10 realizes each of these functional elements 100 to 130 by reading a program stored in the ROM 12, loading the read program into the RAM 13, and executing the loaded program. Notably, that all or a part of the functional elements 100 to 130 may be provided in another ECU separate from the ECU 10 or in an information processing device of a facility (a control center or the like) capable of communicating with the vehicle VH.

The light distribution control unit 100 executes a light distribution control to acquire the position of the light control target in front of the vehicle VH based on the detection result of the external sensor device 40, and to shield or dim a part of the irradiation area by the high beam irradiation according to the acquired position of the light control target object. Examples of the light control target object include the preceding vehicle, an oncoming vehicle, a pedestrian's face, and the road sign. When the position of the preceding vehicle or the oncoming vehicle and the position of the face of the pedestrian are shielded or dimmed, it is possible to prevent the driver of the preceding vehicle or the oncoming vehicle and the pedestrian from being glared by glare. Further, if the position of the retroreflective object such as the road sign is shielded or dimmed, it is possible to prevent the drivers of the own vehicle VH from being glared by the reflected light from the retroreflective object.

Figure 3A:
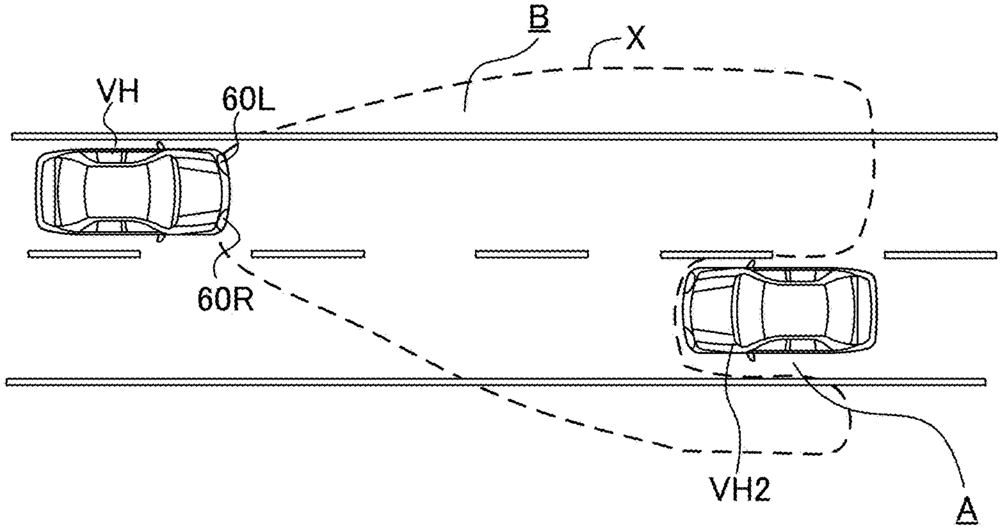
FIG. 3A is a schematic diagram showing an example of a light distribution pattern of high beam light emitted from a headlamp according to the present embodiment.
Figure 3B:
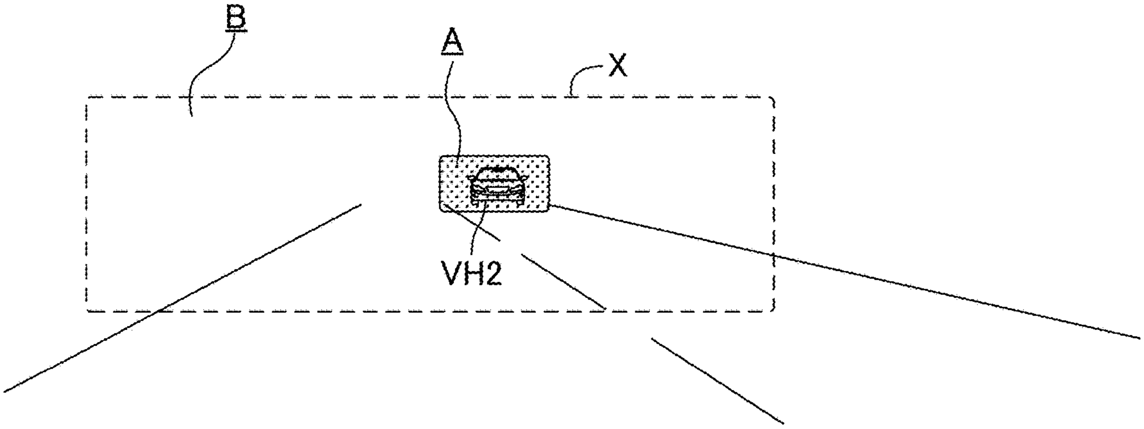
FIG. 3B is a schematic diagram showing an example of a light distribution pattern of high beam light emitted from a headlamp according to the present embodiment.

FIGS. 3A and 3B shows an example of a light distribution pattern of high beam irradiation light emitted from the headlamp 60. The light distribution pattern illustrated in FIGS. 3A and 3B are a combination of the left side headlamp 60L and the right side headlamp 60R. The region surrounded by the broken line X in FIGS. 3A and 3B indicates the irradiation area by the high beam irradiation of the headlamp 60. Note that the broken line X in FIG. 3B indicates an illumination area of a high beam projected on a virtual vertical screen at a predetermined position in front of the vehicle VH.

When, for example, the oncoming vehicle VH2 is acquired as the light control target object on the basis of the detection result of the external sensor device 40, the light distribution control unit 100 causes the headlight 60 to emit high beam irradiation of a light distribution pattern in which an area corresponding to the position of the oncoming vehicle VH2 is shielded or dimmed. Hereinafter, an area in which a high beam is shielded or dimmed by the headlamp 60 is referred to as a "light control area A". In addition, an area irradiated with a high beam by the headlamp 60 is referred to as an "irradiation area B".

The object recognition unit 110 recognizes the object present in front of the vehicle VH based on images transmitted from the cameras 42 of the external sensor device 40. Specifically, when the illuminance around the own vehicle VH acquired by the auto light sensor 50 exceeds the predetermined illuminance, the object recognition unit 110 recognizes the object in the image data by executing the image process of increasing the sharpness of the edge of the object image at the bright place and applying the bright place filters to the image data transmitted from the camera 42.

Further, in a case where the illuminance acquired by the auto light sensor 50 is equal to or less than the predetermined illuminance and the light distribution control unit 100 is not executing the light distribution control, when the low beam is irradiated from the headlamp 60, the object recognition unit 110 recognizes the object in the image data by executing the image processing to which a low beam filter for increasing the sharpness or the like of the contour edge of the object image in the low beam irradiation are is applied with respect to the image data transmitted from the camera 42. Furthermore, when the illuminance acquired by the auto light sensor 50 is equal to or less than the predetermined illuminance and the light distribution control unit 100 is not executing the light distribution control, and when the high beam is irradiated from the headlamp 60, the object recognition unit 110 recognizes the object in the image data by performing the image processing to which a high beam filter for increasing the sharpness or the like of the contour edge of the object image in the high beam irradiation area is applied with respect to the image data transmitted from the camera 42.

Figure 4A:
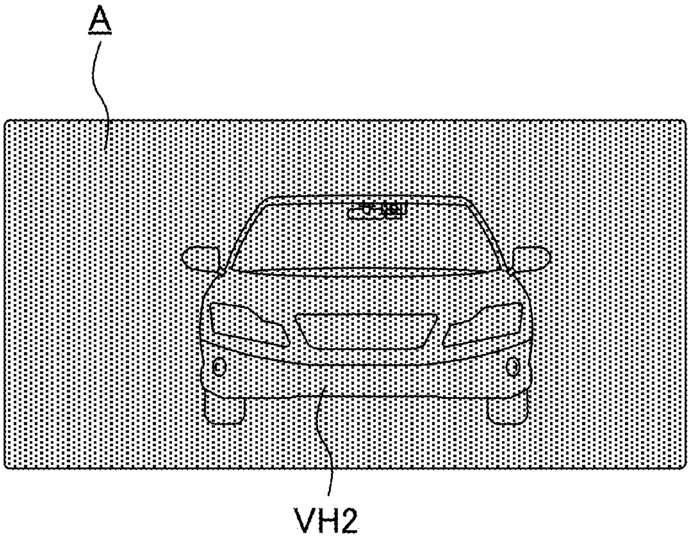
FIG. 4A is a schematic diagram explaining an example of image processing of a light control area according to the present embodiment.

Incidentally, when the light distribution control unit 100 executes the light distribution control by uniformly applying the high beam filter (or the low beam filter) and executing the image process, the brightness of the object image (for example, the oncoming vehicle VH2) existing in the light control area A is insufficient, as shown in FIG. 4A. Therefore, there is a possibility that the object recognition unit 110 cannot recognize the object actually present in the light control area A, resulting in erroneous detection or undetected.

Figure 4B:
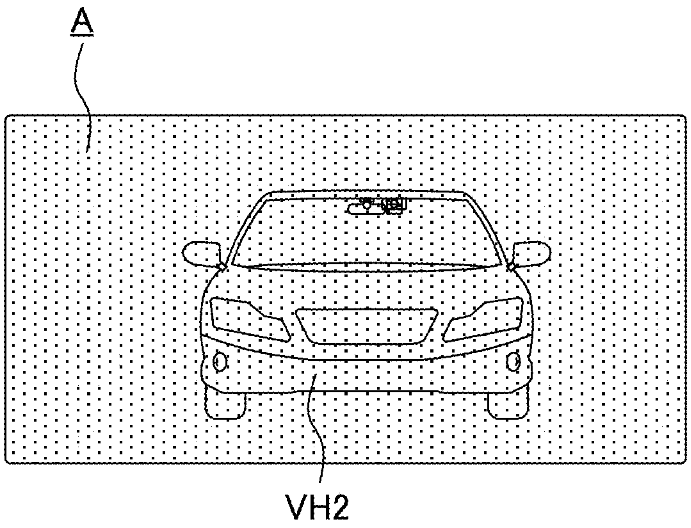
FIG. 4B is a schematic diagram explaining an example of image processing of a light control area according to the present embodiment.

The object recognition unit 110 executes image processing using different filters in the light control region A and the irradiation area B in order to prevent erroneous detection or non-detection of the object existing in the light control area A during execution of the light distribution control. Specifically, the illumination light control area specifying unit 120 specifies the light control area A in which the high beam of the headlamp 60 is shielded or dimmed on the image data and the irradiation area B in which the high beam of the headlamp 60 is irradiated, based on the information of the light distribution control by the light distribution control unit 100. The object recognition unit 110 executes the image processing for applying the high beam filter to the irradiation region B in the image data specified by the illumination light control area specifying unit 120, thereby recognizing the object present in the irradiation region B in the image data. On the other hand, the object recognizing unit 110 executes the image process of applying a light control area filter for increasing the brightness value of the image data and increasing the sharpness or the like of the contour edge of the object image to the light control area A in the image data specified by the illumination light control area specifying unit 120, as shown in FIG. 4B. As a result, it is possible to increase the possibility of recognizing the object present in the light control area A, and it is possible to effectively prevent undetected or erroneous detection.

The PCS control unit 130 is one example of a collision avoidance control unit of the present disclosure and executes the PCS control for avoiding collision between the own vehicle VH and the front object or reducing damage to the collision. The PCS control unit 130 determines whether or not the object to be subjected to PCS control (hereinafter referred to as a target object) exists in front of the own vehicle VH based on the object information recognized by the object recognition unit 110. When it is determined that the target object is present, the PCS control unit 130 acquires the coordinate information of the target object based on the detection result of the external sensor device 40. Further, the PCS control unit 130 calculates the turning radius of the vehicle VH based on the detection results of the vehicle speed sensor 31, the steering angle sensor 34, and the yaw rate sensor 36, and calculates the trajectory of the vehicle VH based on the turning radius. The PCS control unit 130 determines whether the target object in front of the own vehicle VH is obstacle that may collide with the vehicle VH. When the target object is a moving object, the PCS control unit 130 determines the moving object as an obstacle, when the trajectory of the moving object and the trajectory of the vehicle VH intersect each other. When the target object is a stationary object, the PCS control unit 130 determines that the stationary object is an obstacle when the trajectory of the vehicle VH intersects the present position of the stationary object.

When the PCS control unit 130 determines that the target object is the obstacle, the PCS control unit 130 calculates a predicted collision time (Time To Collision: TTC) until the vehicle VH collides with the obstacle based on the distance L from the vehicle SV to the obstacle and the relative velocity Vr of the vehicle VH with respect to the obstacle. TTC is an index indicating a possibility that the vehicle VH collides with the obstacle. TTC can be determined by dividing the distance L from own vehicle SV to the obstacle by the relative velocity Vr (TTC=L/Vr). The PCS control unit 130 determines that the vehicle VH is highly likely to collide with the obstacle when the state in which TTC is equal to or smaller than the predetermined collision determination threshold Tv. In the present embodiment, the object recognition unit 110 recognizes the object in the light control area A by executing the image processing to apply the light control area filter that increases the luminance value of the image data and sharpens the contour edge of the object image to the light control area A in the image data. That is, even when the obstacle to be subjected to the PCS control exists in the light control area A, the obstacle can be effectively prevented from being non-detected or erroneously detected. Accordingly, the accuracy of the collision determination of the PCS control can be reliably improved.

When determining that there is a high possibility of collision, the PCS control unit 130 executes an alarm by the speaker 72 or the display device 71, and also executes an automated braking control. The automated braking control is a control for reducing the own vehicle VH so that the deceleration of the own vehicle VH coincides with a predetermined target deceleration by controlling the activation of the braking device 22 and/or the driving device 20. Accordingly, the own vehicle VH can be forcibly decelerated without requiring the driver to operate the brake pedal.

Figure 5:
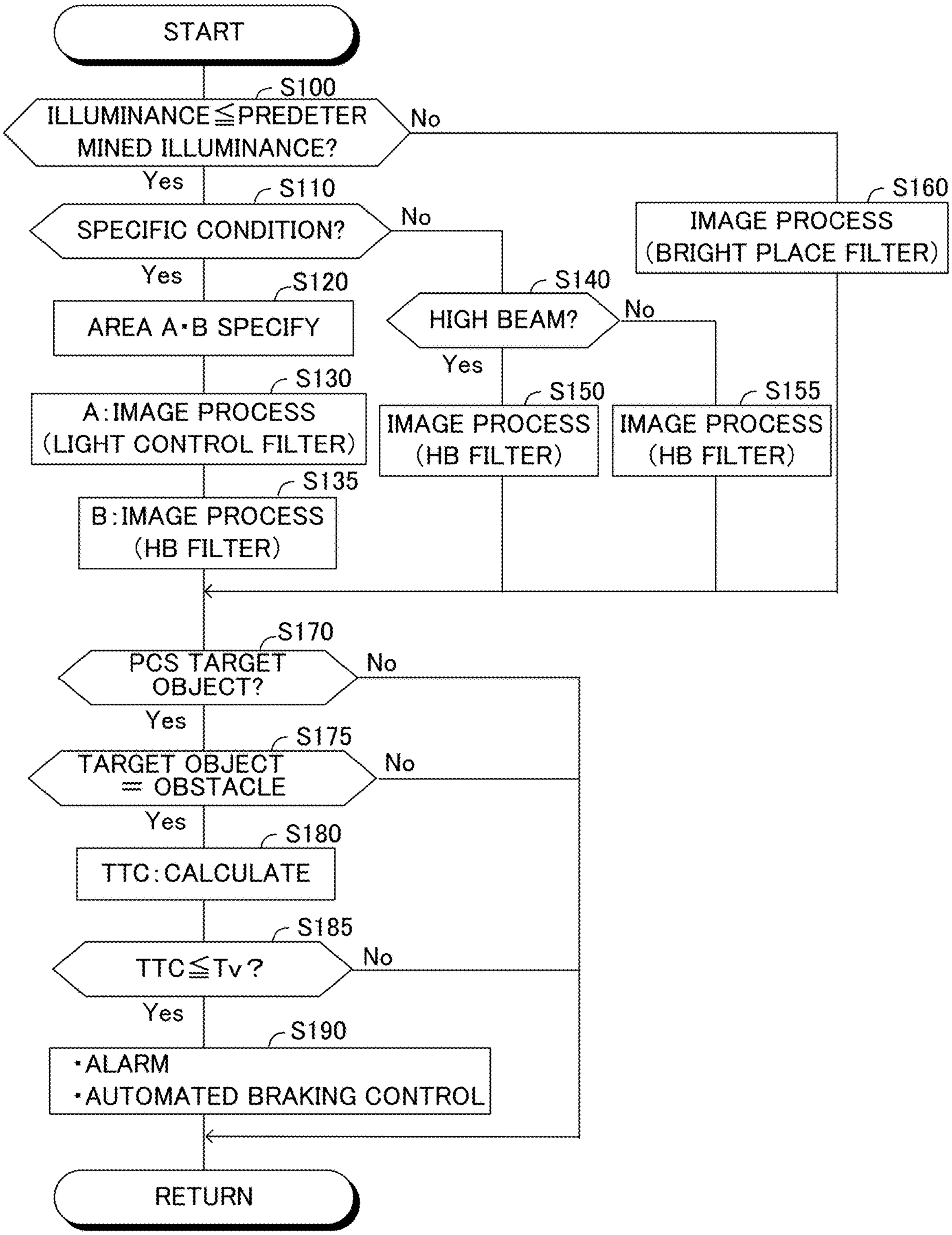
FIG. 5 is a flow chart for explaining a routine of an object recognizing process and a PCS control process according to the present embodiment.

Next, a routine of the object recognition process and the PCS control process by the CPU 11 of the ECU 10 will be described with reference to FIG. 5.

In step S100, the ECU 10 determines whether or not the illuminance around the own vehicle VH is equal to or less than the predetermined illuminance based on the illuminance information acquired by the auto light sensor 50. When the illuminance around the vehicle VH is equal to or less than the predetermined illuminance (Yes), that is, in the dark place, the ECU 10 advances the process to step S110. On the other hand, when the illuminance around the vehicle VH is not equal to or less than the predetermined illuminance (No), that is, when the illuminance is bright, the ECU 10 advances the process to step S160.

In step S160, the ECU 10 recognizes the object in the image data by executing the image process of applying the bright place filter to the image data acquired by the camera 42.

When the process proceeds from step S100 to step S110, the ECU 10 determines whether or not the light distribution control of the headlamp 60 is being executed and whether or not a specific condition in which at least a part of the illumination light of the headlamp 60 is shielded or dimmed is satisfied. When the specific condition is satisfied, the ECU 10 advances the process to step S120. On the other hand, if the specific condition is not satisfied (No), the ECU 10 advances the process to step S140.

In step S140, the ECU 10 determines whether or not the headlamp 60 is illuminating the high beam. If the headlamp 60 is illuminating the high beam (Yes), the ECU 10 advances the process to step S150. On the other hand, if the headlamp 60 is not irradiated with the high beam (No), that is, when the headlamp 60 is irradiated with the low beam, the ECU 10 advances the process to step S155.

In step S150, the ECU 10 recognizes the object in the image data by executing the image process of applying the high beam filter to the image data acquired by the camera 42. On the other hand, in step S155, the ECU 10 recognizes the object in the image data by executing the image process of applying the low beam filter to the image data acquired by the camera 42.

When the process proceeds from step S110 to step S120, the ECU 10 identifies the light control area A in which the high beam of the headlamp 60 is shielded or dimmed and the illumination area B in which the high beam of the headlamp 60 is irradiated. Next, in step S130, the ECU 10 recognizes the object in the image data by executing the image process of applying the light control area filters to the light control area A in the image data. Further, in step S135, the ECU 10 recognizes the object in the image data by executing the image process of applying the high beam filter to the irradiated area B in the image data. Note that the process of step S130 and step S135 is not sequential, and may be performed simultaneously.

In step S170 proceed from step S135 or step S150 or step S155 or step S160, the ECU 10 determines whether or not the object recognized by the image process is the target object of the PCS control existing in front of the own vehicle VH. When the object is the target object of the PCS control (Yes), the ECU 10 advances the process to step S175. On the other hand, when the object is not the target object of the PCS control (No), the ECU 10 returns this routine.

In step S175, the ECU 10 determines whether or not the target object recognized in step S170 process is the obstacle. When the target object is the moving object, the ECU 10 determines the target object as the obstacle when the trajectory of the target object and the trajectory of the own vehicle VH intersect each other. When the target object is the stationary object, the ECU 10 determines that the target object is the obstacle when the trajectory of the own vehicle VH intersects the present position of the target object. When determining that the target object is the obstacle (Yes), the ECU 10 advances the process to step S180. On the other hand, if the ECU 10 determines that the target object in front of the own vehicle VH is not the obstacle (No), the ECU 10 returns this routine.

In step S180, the ECU 10 calculates the TTC (=L/vr) by dividing the distance L from the own vehicle VH to the target object by the relative velocity Vr. Then, in step S185, the ECU 10 determines whether the TTC is less than or equal to the collision determination thresholds Tv. If the TTC is less than or equal to the collision determination threshold Tv (Yes), the ECU 10 advances the process to step S190. On the other hand, if the TTC is greater than the collision determination threshold Tv (No), the ECU 10 returns this routine.

In step S190, the ECU 10 executes the alarm and the automated braking control to decelerate the own vehicle VH based on the predetermined target deceleration, and returns this routine.

In the above, the object recognition apparatus according to the at least one embodiment have been described, but the present disclosure is not limited to the above-mentioned at least one embodiment, and various modifications are possible within the range not departing from the object of the present disclosure.

For example, in the above embodiment, the object recognized by the object recognition unit 110 is described as being applied to the PCS control, but it can also be applied to other driving assist control such as an adaptive cruise control (ACC) and a lane trace assist control (LTA). Further, the application of the present disclosure can also be applied to the vehicle that automatically performs some or all of the driving operations.

What is claimed is:

1. An object recognition apparatus comprising:

an imaging unit for capturing an image of a predetermined area in front of a vehicle;

an object recognition unit configured to recognize presence of an object in a captured image by executing a predetermined image process on the captured image captured by the imaging unit;

a light distribution control unit for controlling an irradiation range of an irradiation light emitted from a headlamp provided in the vehicle;

an area specifying unit for dividing the captured image into (i) a light control area in which the irradiation light is shielded or dimmed and (ii) an irradiation area in which the irradiation light is not shielded or dimmed, based on light distribution control information from the light distribution control unit, wherein the object recognition unit is further configured to execute a first image process in the irradiation area, and execute a second image process in the light control area, when the object is located in the light control area of the captured image, the second image process includes increasing a luminance of the captured image and increasing a sharpness of a contour edge of the object to recognize the object, and when the object is located in the irradiation area of the captured image, the first image process includes applying a high beam filter to recognize the object.

2. The object recognition apparatus according to claim 1, wherein the second image process includes applying a light control area filter for increasing the luminance of the captured image.

3. A vehicle control device comprising:

the object recognition apparatus according to claim 1; and a collision avoidance control unit configured to execute a collision avoidance control for avoiding a collision between the vehicle and the object or reducing the damage of the collision when the object recognized in front of the vehicle satisfies a predetermined collision condition, wherein the object recognition unit causes the collision avoidance control unit to recognize the object by transmitting an information of the recognized object to the collision avoidance control unit.

* * * * *